US009928183B2

(12) United States Patent
Svendsen et al.

(10) Patent No.: US 9,928,183 B2
(45) Date of Patent: Mar. 27, 2018

(54) PRIORITY FRAMEWORK FOR A COMPUTING DEVICE

(71) Applicant: APPLIED MICRO CIRCUITS CORPORATION, Sunnyvale, CA (US)

(72) Inventors: Kjeld Svendsen, Sunnyvale, CA (US); Millind Mittal, Palo Alto, CA (US); Gaurav Singh, Los Altos, CA (US)

(73) Assignee: Ampere Computing LLC, Santa Clara, CA (US)

( * ) Notice: Subject to any disclaimer, the term of this patent is extended or adjusted under 35 U.S.C. 154(b) by 142 days.

(21) Appl. No.: 14/497,619

(22) Filed: Sep. 26, 2014

(65) Prior Publication Data

US 2016/0092379 A1  Mar. 31, 2016

(51) Int. Cl.
*G06F 13/18* (2006.01)

(52) U.S. Cl.
CPC .......... *G06F 13/18* (2013.01); *Y02B 60/1228* (2013.01)

(58) Field of Classification Search
None
See application file for complete search history.

(56) References Cited

U.S. PATENT DOCUMENTS

| 6,601,151 | B1 | 7/2003 | Harris |
| 6,697,909 | B1 | 2/2004 | Wang et al. |
| 6,865,730 | B1 | 3/2005 | Burke et al. |
| 7,529,683 | B2 | 5/2009 | Horvitz et al. |
| 7,899,994 | B2 | 3/2011 | Zhao et al. |
| 8,359,449 | B2 | 1/2013 | Accapadi et al. |
| 8,448,006 | B2 | 5/2013 | Floyd et al. |
| 8,595,740 | B2 | 11/2013 | Pike |
| 2005/0138300 | A1 | 6/2005 | Chen |
| 2006/0031838 | A1* | 2/2006 | Chrabieh .............. G06F 9/4881 718/100 |
| 2009/0271716 | A1* | 10/2009 | Jones ................... G06Q 10/109 715/758 |
| 2011/0246688 | A1* | 10/2011 | Vaz ..................... G06F 13/1642 710/54 |
| 2012/0072668 | A1 | 3/2012 | Chirca et al. |
| 2012/0311277 | A1* | 12/2012 | Chu .................... G06F 13/1626 711/158 |
| 2014/0195699 | A1* | 7/2014 | Sokol, Jr. ................ G06F 13/18 710/40 |

OTHER PUBLICATIONS

International Search Report & Written Opinion for PCT Application Serial No. PCT/US2015/042598, dated Nov. 12, 2015, 13 pages.

* cited by examiner

*Primary Examiner* — Tracy Chan
(74) *Attorney, Agent, or Firm* — Alston & Bird LLP

(57) ABSTRACT

Proving for a framework for propagating priorities to a memory subsystem in a computing system environment is disclosed herein. By way of example, a memory access handler is provided for managing memory access requests and determining associated priorities. The memory access handler includes logic configured for propagating memory requests and the associated priorities to lower levels of a computer hierarchy. A memory subsystem receives the memory access requests and the priorities.

20 Claims, 10 Drawing Sheets

PRIORITY FRAMEWORK FOR A COMPUTING DEVICE

TECHNICAL FIELD

The present disclosure relates to the field of computing; e.g., aspects of the present disclosure relate to a priority framework for memory requests that facilitates propagating priorities to a memory subsystem.

BACKGROUND

In computing systems, a memory controller can be thought of as an intermediary between a processor (e.g., central processing unit) and main memory (e.g., dynamic random access memory, i.e., DRAM) that prioritizes and schedules memory requests. Memory requests typically involve either a read request or a write request.

A memory controller schedules memory requests to memory based on a scheduling scheme, such as a first-in-first-out scheme. The memory can be system main memory or other memory, such as cache memory. Cache memory is much more quickly accessed by a central processor than system main memory. Accordingly, the more frequently the central processor can rely on cache memory for performing various memory operations, the better the performance in terms of latency and similar metrics

SUMMARY

The following presents a simplified summary in order to provide a basic understanding of some aspects described herein. This summary is not an extensive overview of the disclosed subject matter. It is intended to neither identify key elements of the disclosure nor delineate the scope thereof. Its sole purpose is to present some concepts in a simplified form as a prelude to the more detailed description that is presented later.

The present disclosure relates to a memory priority framework for a computing system that facilitates assignment of priority to computer instructions (e.g., memory access requests, program threads, etc.). Priority of instructions can be determined at any level of a computing system (e.g., application level, presentation level, operating system level, compiler level, micro-architectural level, etc.). Priority indicators or priority hints can be passed to and from various levels in a computing system. A memory controller can receive the priority indicators. Based on the priority indicators, the memory controller system can schedule memory access requests such that memory access requests having a higher priority are executed before memory access requests that have a lower priority relative to the priorities of the other memory access request.

In at least one embodiment of the present disclosure, a first level memory access handling unit generates memory access requests and determines respective priorities of the memory access requests. The memory access requests can be represented by application threads, or other instructions. The first level memory access handling unit is of a higher level respective to the memory subsystem. The memory requests and respective priorities can be propagated through computer subsystems (e.g., a second level memory access handling unit, etc.). A memory subsystem can receive the memory requests and determining respective priorities of the memory access requests. Memory access requests can be schedule and/or prioritized based on the determined priorities.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

DETAILED DESCRIPTION

Figure 1:
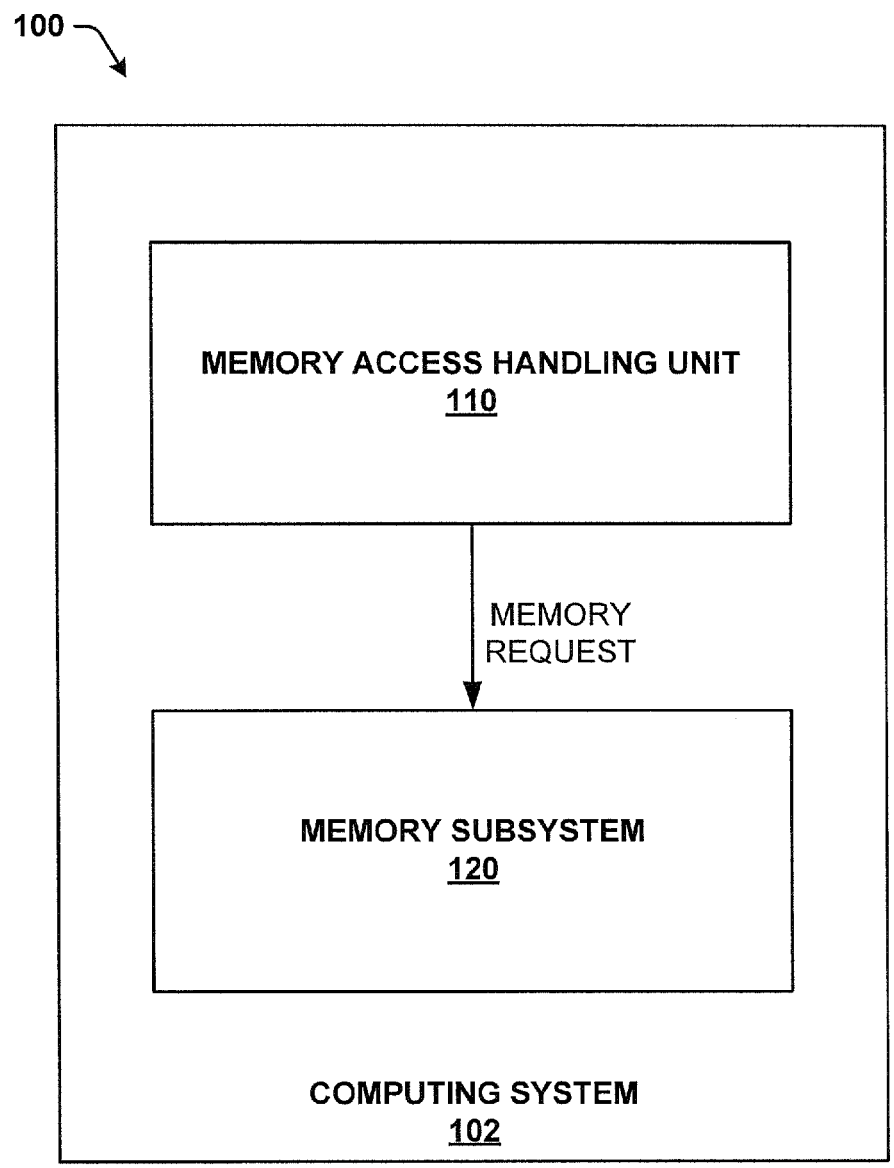
FIG. 1 depicts a block diagram of a sample system comprising a a computing system and memory access handling unit in accordance with one or more disclosed aspects.

As utilized herein, terms "component," "system," and the like are intended to refer to an electronic or computing entity, either hardware, software (e.g., in execution), or firmware. For example, a component can be one or more transistors, memory devices, memory cells, a gate array, a programmable gate array, an application specific integrated circuit, a controller, an arrangement of memory devices, a circuit, data transfer or integration circuitry, an electronic clock, a process running on a processor, a processor, an object, a state machine, a computer, etc. By way of illustration, a circuit, a memory, a memory device, a memory module, a cache, a transistor array electrically connected with the circuit, a controller that manages data flow between the transistor array and the circuit, an executable instruction, a set or sequence of executable instructions, a bus, a signal bus, a data bus, a communication bus, an interface, a signal interface, or the like, or a suitable combination thereof, can be a component. The component can include erasable programming (e.g., process instructions at least in part stored in erasable memory) or hard programming (e.g., process instructions burned into non-erasable memory at manufacture). Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

According to further illustrative examples, both a process executed from memory and the processor can be a component, unit, or the like. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

Computer systems can include many levels or layers of detail. These levels (e.g., abstraction levels, abstraction layers, etc.) are generalizations of a model or algorithm that are independent of any specific implementation. The levels are often comprised in a hierarchy of abstraction levels that represent a computing systems architecture or framework. Each level can be associated with specific functions and can be thought of as a virtual machine. Higher levels can call upon lower levels to execute or facilitate tasks when necessary. While, various levels of a computing system are referred to herein, it is appreciated that various other nomenclatures or representations of a computer hierarchy can be used interchangeably. Higher levels refer to a greater level of abstraction. For example, an application level is considered a higher level than a compiler level.

In general, an application level can refer to operations and/or applications that facilitate a user producing results specific to a given application. For example, word processing applications, internet browsers, and the like can be included in an application level. Threads or other processes generated in the application level can be processed by a processing device, such as a central processing unit (CPU). Typical users are most familiar with the application level as it is where most interactions occur. A compiler level can include compilers (e.g., programs, instructions sets, etc.) that translate programming language into an assembly language, which is then translated into machine language, to facilitate memory access. An operating system (OS) level can include instructions or processes generated by an OS. These instructions can facilitate multiprogramming, protecting memory, synchronizing processes, and various other functions. It is noted that instructions that are translated from a compiler level to a machine level, may or may not be altered in the OS level. In an aspect, the OS can be thought of as a bridge between higher levels and lower levels. A micro-architectural level can facilitate generation of microinstructions that represent low-level control instructions that define the set of data path control signals, which apply to a given state of a computing machine. In some embodiments, the microinstructions, together with their sequencing, can comprise the micro-architectural level. The micro-architectural level can interface and/or interact with a memory subsystem.

The different levels of a computing system can be associated with memory request handlers that can be configured to determine a level of importance for memory access requests. While "memory access requests" are referred to herein, it is noted that memory access requests can refer to higher level instructions that, when processed, result in a memory access request (e.g., instructions or process threads at an application level, OS level, etc.). At the application level different applications configured for generating instructions to access memory and each application can have different priorities depending on importance (subjective or objective). At the OS level, instructions can be generated such that each have different levels of importance. For example, an interrupt generated by an OS can have a higher level of importance compared to other OS commands/instructions. In another aspect, a compiler (e.g., at a compiler level) can determine priorities of various instructions to achieve higher throughput, low data interaction, or the like. At a micro-architectural level CPU operations and input/output (I/O) operations can have differing priorities.

FIG. 1 illustrates a block diagram of an example memory system 100 comprising a computing system 102. Memory system 100 can facilitate prioritizing memory access request at a memory subsystem based on priority indicators from various computer architectural levels. As depicted, computing system 100 can primarily comprise a memory access handling unit 110 (which can be configured for assigning priorities to memory access requests at a high level) and a memory subsystem 120 (which can be configured for storing memory access requests and processing the memory access requests according to determined priorities). system 100, as well as other systems described herein, are represented as including functional blocks, which can be functional blocks that represent functions implemented by a hardware, software, or combination thereof (e.g., firmware). In some aspects, the functional blocks can represent non-transitory computer-readable media. In other aspects, the functional blocks can represent transitory computer-readable media.

Memory access handling unit 110 can be configured for receiving instructions that, when processed, request access to a memory of memory subsystem 120. In one or more embodiments, memory access handling unit 110 can be comprised within one or more levels of a computing system, between levels of a computing system, and/or between a processor and memory subsystem 120.

In various embodiments of the subject disclosure, memory access handling unit 110 can be configured for assigning or determining a level of priority for a function and/or instruction. The level of priority can be determined according to a desired priority determining process, based on a hierarchical level that originated the instruction, based on the type of instruction, or the like. As an example, a high priority can be assigned to a first application at an application level based on a user's subjecting input and a low priority can be assigned to a second application based on the user's input. In an aspect, a user can determine that the first application is of greater importance than the second application and thus should have a higher priority.

Priority can be assigned to instructions or groups of instructions (e.g., an application, a type of instruction such as an interrupt, etc.) (based on various prioritization schemes. Various prioritization schemes can be applied at various levels in a computer hierarchy. For example, memory access handling unit 110 can be configured for assigning a high priority to some or all processes associated with a first application and can assign a lower priority to some or all processes associated with a second application. In another aspect of the subject disclosure, memory access handling unit 110 can be configured for assigning priorities to instructions at a compiler level, such as abased on whether the instructions are associated with shared data or private data. At an OS level, the memory access handling unit 110 can be configured for assigning higher priorities, in comparison to priorities of other instructions, to interrupts at the OS level. At the micro-architectural level, a processor can be configured for determining priorities for memory access requests and for communicating the memory access requests and associated priorities to memory subsystem 120.

According to one or more embodiments of the subject disclosure, prioritization schemes, at various architectural levels, can be configured for reducing memory access latency, increasing efficiency (e.g., power reduction), increasing performance (e.g. increasing throughput), altering other performance metrics, or the like. In response to determining priorities at various levels, the priorities can be passed or propagated to other levels or otherwise communicated to other levels via memory access handling unit 110. As processes propagate down from hierarchy levels, memory access handling unit 110 can be configured for re-prioritizing the processes and/or associated instructions. For example, memory access handling unit 110 can be configured for receiving a set of process threads having associated priorities from an application level. As a compiler level translates or converts the application processes into assembly language, the associated priorities can be taken into account when prioritizing the assembly language instructions. Likewise, as the assembly language instructions are passed to an OS or lower level, the memory access handling unit 110 can be configured for re-prioritizing associated instructions based on an OS level or lower level prioritization scheme. Ultimately, processes and/or associated instructions that are associated with memory access requests will be passed to memory subsystem 120 along with their respective priorities.

Memory access handling unit 110 can be configured for identifying or marking processes with priority indicators or tokens. The priority indicators can be handled in one or more ways depending on the architectural level where priority is determined and/or assigned. In an aspect of the subject disclosure, a compiler component can mark instructions with a priority indicator representing a determined priority level. An OS component can mark address spaces with priority indicators or information, such as in a translation look-aside buffer (TLB). At a transactional level, priority indicators can be differentiated from a transaction generating agent with differing properties between CPU and I/O operations. For example, cache miss operations can be marked as higher priority than prefetch operations. In another example, a CPU instruction can be associated with a single or multi-bit priority indicator.

Memory access handling unit 110 can be configured for determining priority according to various scaling mechanisms. In at least one embodiment of the subject disclosure, a two level priority scale can be utilized. In a two level priority scale, a process can be marked as high priority or as regular priority. For example, a single bit priority indicator can mark a memory access as high or low (e.g., 1 or 0). At an application level, priority can be indicated as high or low and the priority can be propagated to a memory subsystem.

In various other embodiments of the subject disclosure, more than two levels of priority can be utilized. It is appreciated that any number of priority levels can be utilized to facilitate assigning priorities to memory access requests. Such as an urgent priority level, a high priority level, a normal priority level, and a low priority level. It is noted that various other levels and/or nomenclatures can be utilized according to various embodiments of the subject disclosure.

Memory subsystem 120 can be configured for receiving memory access requests and associated priorities. The memory access requests can be processed according to the priorities. It is noted that the priorities can be determined based on priority indicators such as a single bit or multi-bit priority indicator. In response to receiving a memory access request and a priority indicator, memory subsystem 120 be configured for determining a level of priority for the memory access request. Once a level of priority is determined, memory subsystem 120 can be configured for servicing higher priority memory access requests prior to servicing lower priority memory access requests. In an example, an input queue of memory subsystem 120 be configured for facilitating storage of a number of memory access requests awaiting service (e.g., processing). As a new memory access request is received, memory subsystem 120 (e.g., via a memory processing unit (MPU)) can be configured for re-ordering the queue to place the new memory access request ahead of lower priority memory access requests. Prioritizing memory access requests can lead to higher priority requests having a decreased latency and overall improvement of system 100.

In some embodiments of the subject disclosure, a processing unit or other device interfacing with memory subsystem 120 can be configured for transmitting memory access requests to inputs (e.g., bit lines), queues, or the like that are associated with a determined priority level. For example, different inputs of memory subsystem 120 can be associated with differing levels of priority. As another example, memory subsystem 120 can comprise multiple memory access request queues that have associate priority levels. In response to determining a priority level of a memory access request, memory subsystem 120 can place or store the memory access request in an appropriate input queue based on the determined level of priority.

While one memory subsystem is illustrated, it is noted that system 100 can comprise multiple memory subsystems. It is further noted that memory subsystem 120 be configured for controlling memory accesses for one or more memory devices. In some embodiments, memory access requests may only have a priority for memory read requests, while memory write requests may not be directly affected by priority levels.

Figure 2:
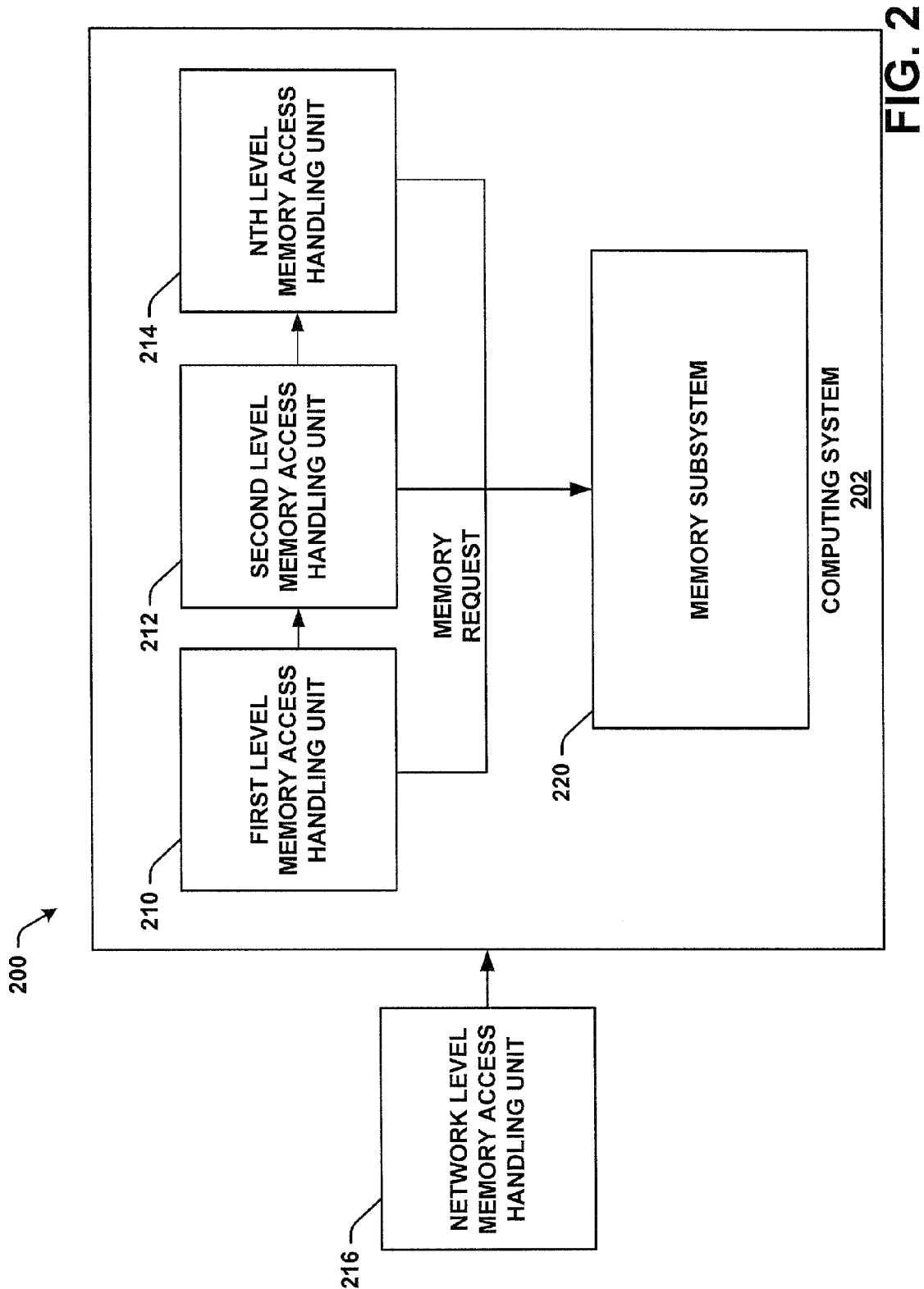
FIG. 2 depicts a block diagram of a sample system comprising a N memory access handling unit in accordance with one or more disclosed aspects.

FIG. 2 depicts a block diagram of an example memory access priority system 200 according to one or more additional aspects of the subject disclosure. System 200 can be configured for facilitating a memory access priority framework in a computing system 202. In some disclosed aspects, system 200 can be substantially similar to system 100. System 200 can comprise additional components or additional features described herein.

System 200 can primarily include computing system 202, which can provide a memory subsystem 220 capable of handling memory access requests based on a priority schema. Computing system 200 can also include a first level memory access handling unit 210, a second level memory access handling unit 212 and an Nth level memory access handling unit 214, where N is a number. In another aspect of the subject disclosure, a network level memory access handling unit 216 can be in communication with computing system 200.

Memory subsystem 220 can be configured for receiving memory access requests with associated priority indicators. In response to receiving memory access requests, memory subsystem 220 can be configured for processing or scheduling memory access requests according to a determined priority. For example, memory access requests (e.g., read requests) can be generated based on higher level operations associated with one or more levels of a computer hierarchy (e.g., application, compiler, OS, etc.). Priorities can be propagated, along with appropriate operations, to memory subsystem 220. Memory subsystem 220 can be configured to determine priorities of memory access requests based on various priority determining mechanisms. In an example, memory subsystem 220 can be configured to determine priorities based on a bit level priority indicator. A bit level priority indicator can be a dedicated bit or set of bits that indicate a level of priority. The number of bits utilized for a priority indicator can depended on the number of priority levels utilized by system 200.

In another embodiment of the subject disclosure, memory subsystem 220 can be configured to determine priorities of memory access requests based on a bit line or pin that receives the memory access requests. For example, a processing unit can be configured to transmit a memory access request to one of a set of bit lines or pins of memory subsystem 220. Each pin can be associated with a determined priority level. In response to receiving a memory access request at a specific pin, memory subsystem 220 can determine the priority associated with the memory access request based on the priority associated with a receiving pin.

Higher levels of system 200 can be configured to comprise and/or communicate with one or more memory access handling units. As illustrated in FIG. 2, a first level of a computing architecture can be configured for comprising first level memory access handling unit 210, a second level of a computing architecture can be configured for comprising second level memory access handling unit 212, and each level up to the Nth level of the computing architecture can be configured for comprising and a memory access handling unit. In various embodiments of the subject disclosure, the memory access handling units can be configured for prioritizing instructions, processes, applications, and the like. In another aspect, the memory access handling units can be configured for propagating the priorities and associate instructions to lower levels of system 200.

First level memory access handling unit 210 refers to a memory access handling unit associated with a highest level of a computing architecture (e.g., application level), second level memory access handling unit 212 refers to a memory access handling unit associated with a second highest level of a computing architecture (e.g., compiler level, high-level language level, assembly level, etc.), and Nth level memory access handling unit 214 refers to a memory access handling unit associated with a Nth highest level of a computing architecture (micro-architectural level, transactional level, etc.).

First level memory access handling unit 210 can be configured to interface with second level memory access handling unit 212. Instructions associated with processes at the first level and respective priorities can be passed to second level memory access handling unit 212. Second level memory access handling unit 212 can be configured for determining priorities and translating instructions from the first level into lower level instructions. As the instructions are translated, priorities can be re-determined based in part on the priorities received from higher levels.

In at least one embodiment of the subject disclosure, network level memory access handling component 216 can be configured for communicating instructions to computing system 202. Instructions from network level memory access handling component 216 can represent instructions from other computing systems, servers, network applications, and the like. In an aspect, priorities can be associated with the network level instructions. In an example, network instructions can have a different priority than internal instructions, varying levels of priority, and the like.

Figure 3:
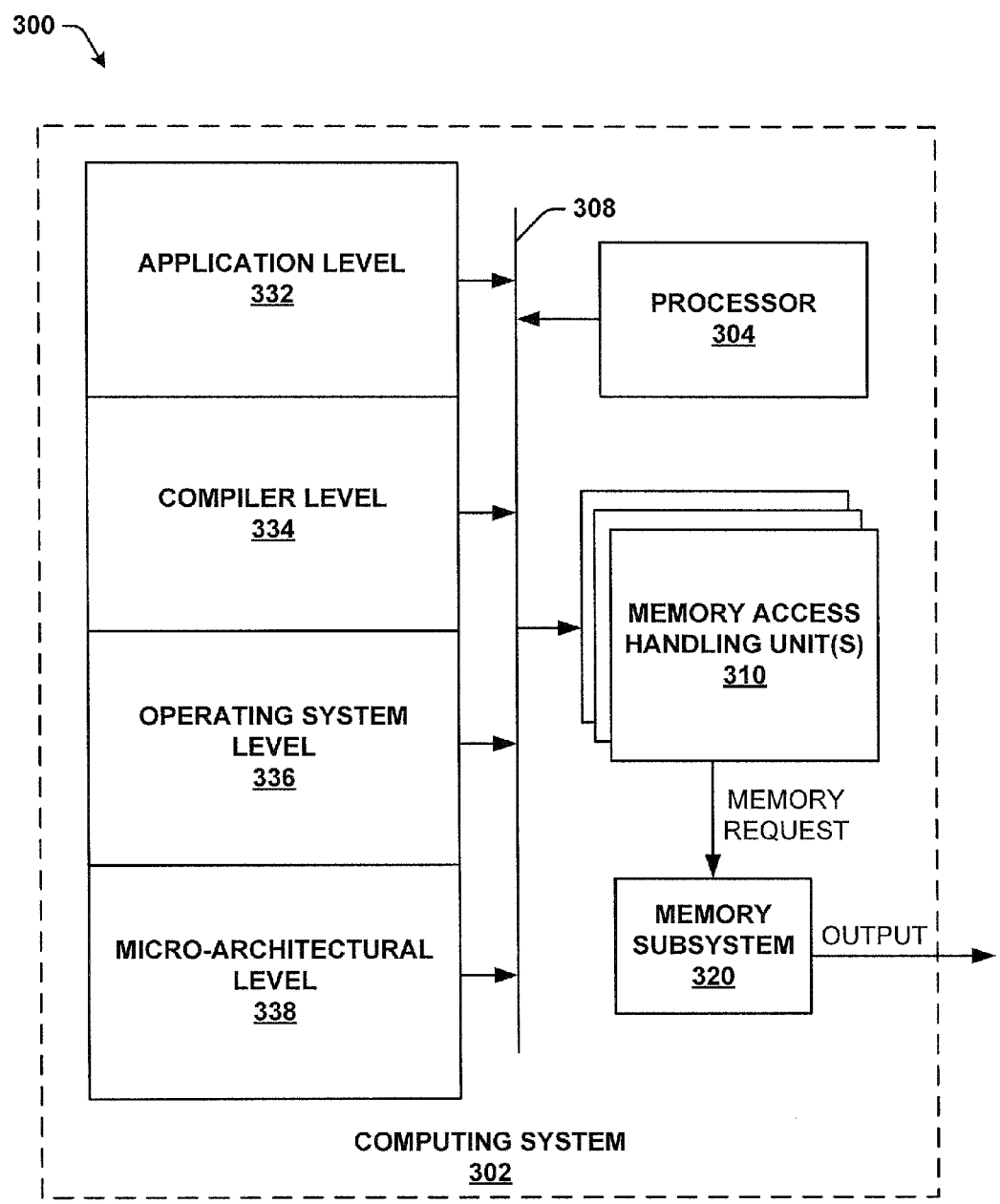
FIG. 3 depicts a block diagram of a sample system comprising a leveled hierarchy and a memory access handling unit in accordance with one or more disclosed aspects.

FIG. 3 depicts a block diagram of an example memory access priority system 300 according to one or more additional aspects of the subject disclosure. System 300 can be configured for facilitating a memory access priority framework in a computing system 302 having various architectural levels. In some disclosed aspects, system 300 can be substantially similar to various other disclosed systems, such as system 100 and system 200. System 300 can comprise additional components or additional features described herein.

System 300 can primarily include computing system 302, which can provide a memory subsystem 320 capable of fulfilling memory access requests based on a priority schema. Computing system 302 can primarily comprise a leveled hierarchy, one or more memory access handling units 310, a processor 304, and a memory subsystem 320. A communications bus 308 can be configured for facilitating communication among the various components of system 300.

Application level 332 can be configured for executing various computer executable components such as applications. In some aspects, user can interact with the applications such as word processors, email applications, multimedia applications, internet browsers, and the like. In an aspect, a memory can be configured for storing computer executable components and processor 304 can be configured for executing components stored in the memory. Priority can be assigned based on the component that generates an instruction, types of instructions, groups of components, and the like.

Compiler level 334 can be configured for translating high-level languages into assembly language and/or machine language. A compiler component of the compiler level 334 can be configured for determining memory access needs, generating instructions, and the like. In an aspect, the compiler can be configured for receiving instructions from the application level 332 and, in response, generating lower level instructions based on the received instructions.

OS level 336 can be configured for generating OS level instructions and/or operations. It is noted that some instructions may be received from the complier level 334 and/or higher levels and, in response, the OS level 336 can generate appropriate OS instructions. Other instructions from higher levels may not be altered by the OS level 336 and can pass directly to lower levels and/or memory subsystem 320. OS instructions can include instructions for managing memory access requests, handling interrupts, providing services for other levels of the computer architecture, and the like.

Micro-architectural level 338 can be configured for facilitating generation of microinstructions that represent low-level control instructions that define the set of data path control signals which apply to a given state of a computing machine. In some embodiments, the microinstructions, together with their sequencing, can comprise the micro-architectural level 338.

In one or more embodiments, memory access handling unit(s) 310 can be configured for determining priorities for instructions generated at the application level 332, compiler level 334, OS level, 336, micro-architectural 338 and/or other levels associated with computing system 302. In an aspect of the present disclosure, memory access handling unit(s) 310 can comprise a number of memory access handling units for each level, a single memory access handling unit configured to handle memory priorities for all levels, and/or a different number of memory access handling units.

Figure 4:
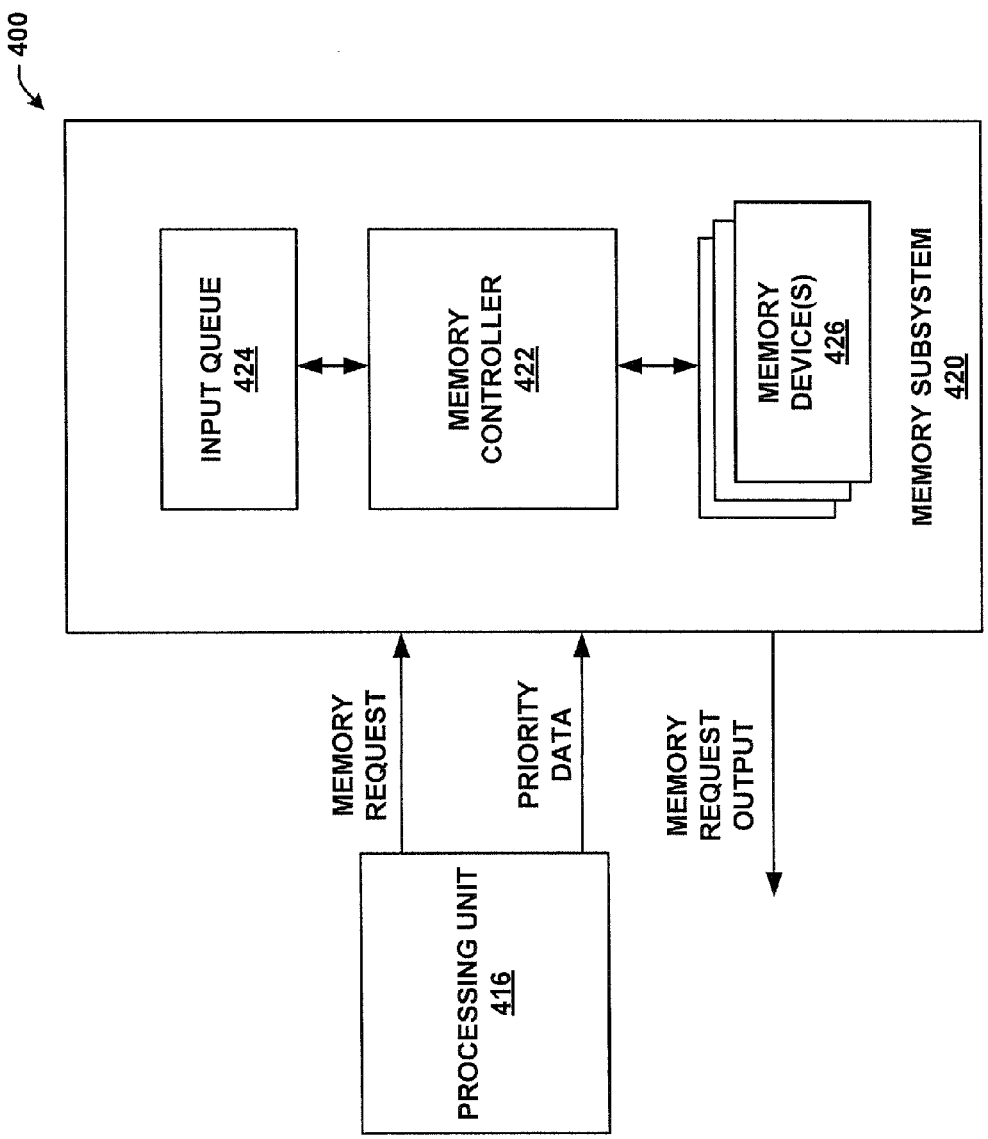
FIG. 4 depicts a block diagram of a sample system comprising a memory subsystem in accordance with one or more disclosed aspects.

FIG. 4 depicts a block diagram of an example memory access priority system 400 according to one or more additional aspects of the subject disclosure. System 400 can be configured for prioritizing and processing memory access requests. System 400 can primarily include computing processing unit 416 and memory subsystem 420, which can include memory controller 422, input queue 424, and memory device(s) 426. In at least one aspect of this disclosure, memory subsystem 420 can be substantially similar to various other disclosed memory subsystems, such as memory subsystem 120, memory subsystem 220, and memory subsystem 320. It is noted that memory subsystem 420 can comprise additional components or additional features described herein.

Processing unit 416 can be configured for interfacing with memory subsystem 420. In one or more aspects of the present disclosure, processing unit can be configured for transmitting memory requests and associated priority data to memory subsystem 420. The memory requests and priority data can represent memory requests that result from execution of higher-level instructions and/or comments, such as instructions from an application level, as well as other instructions, such as input/output instructions. In at least one embodiment, processing unit 416 can be configured for determining priorities of memory access requests, scheduling memory access requests, determining memory addresses to be associated with memory access requests, and/or synchronizing memory access requests.

In at least one embodiment, processing unit 416 can be configured for transmitting higher priority memory access requests to memory subsystem 420 before transmitting lower priority memory access requests. For example, processing unit 416 can be configured for storing a set of memory access requests waiting servicing and for selecting higher priority memory access requests to be transmitted to memory subsystem 420 ahead of lower priority requests. In various aspects of the subject disclosure, processing unit 416 can be configured for facilitating a fairness scheduling process that ensures requests are not kept waiting (e.g., un-serviced) for a determined amount of time. It is appreciated that processing unit 416 can be configured for utilizing various fairness scheduling processes in conjunction with various priority marking processes.

Memory subsystem 420 can be configured for receiving memory access requests and associated priority data from processing unit 416. While memory requests and priority data are illustrated as being separate, it is appreciated that memory requests can comprise priority data. For example, a memory request can comprise a dedicated bit (or set of bits) that indicate a level of priority. In response to receiving a memory request, memory controller 422 can be configured for determining whether to process the request or store the request in input queue 424. In at least one aspect of the subject disclosure, memory controller 422 can be configured for processing the a received memory access request if the input queue 424 is empty.

In various embodiments of the present disclosure, memory controller 422 can be configured for storing memory access requests in input queue 424 based on determined levels of priority associated with each memory access request. Memory access requests having a higher level of priority can be arranged in input queue 424 such that they will be processed before lower level priority memory access requests. It is noted that input queue 424 can be configured to comprise one or more input queues. For example, input queue 424 can comprise separate queues for read and write requests.

In at least one embodiment of the subject disclosure, input queue 424 can comprise separate queues for different priority levels. For example, input queue 424 can comprise a queue for high priority requests, a queue for medium priority requests, and a queue for low priority requests. Memory controller 422 can be configured for placing each received memory request in the appropriate queue. In another aspect, memory controller 422 can be configured for processing all the memory access requests stored in the high priority queue. Once the high priority queue is empty, memory controller 422 can be configured for processing all the memory access requests stored in the medium priority queue. Likewise, once the medium priority queue is empty, memory controller 422 can be configured for processing all the memory access requests stored in the low priority queue. If at any time, a new memory access request is received, memory controller 422 can be configured for determining a level of priority associated with the request and, if the priority is higher than any other request stored in input queue 424, for processing the memory access request before the other lower priority requests.

In one or more embodiments, memory controller 422 can be configured for applying a fairness schedule to memory access request in the input queue 424. In an example, memory controller 422 can be configured for monitoring a length of time that a received memory request has been waiting for servicing. A time of arrival can be stored and associated with each memory access request and the time of arrival can be compared with a current time to generate a wait time. It is noted that time can be measured based on an internal clock of a computing system and/or of memory subsystem 420. Memory controller 422 can be configured for determining whether a memory access request has been waiting for a threshold amount of time, and if so, increasing a priority level for the memory access request or otherwise improving the chances of the memory access request being serviced before other memory access requests of the same of other priority levels.

Memory device(s) 426 can comprise one or more memory devices, such as main system memory, cache memory, on-chip memory, and the like. In some embodiments of the present disclosure, a computing system (e.g., computing system 102, 202, 302, etc.) can comprise multiple memory subsystems 420 which can be associated with different memory device(s) 426.

Memory device(s) 426 can be configured for storing data that can be read, written, or otherwise accessed. Memory controller 422 processes memory access requests to memory device(s) 426 that can return a result to the memory access request. In various example of the subject application, data can be stored in addressable locations of memory device(s) 426.

Figure 5:
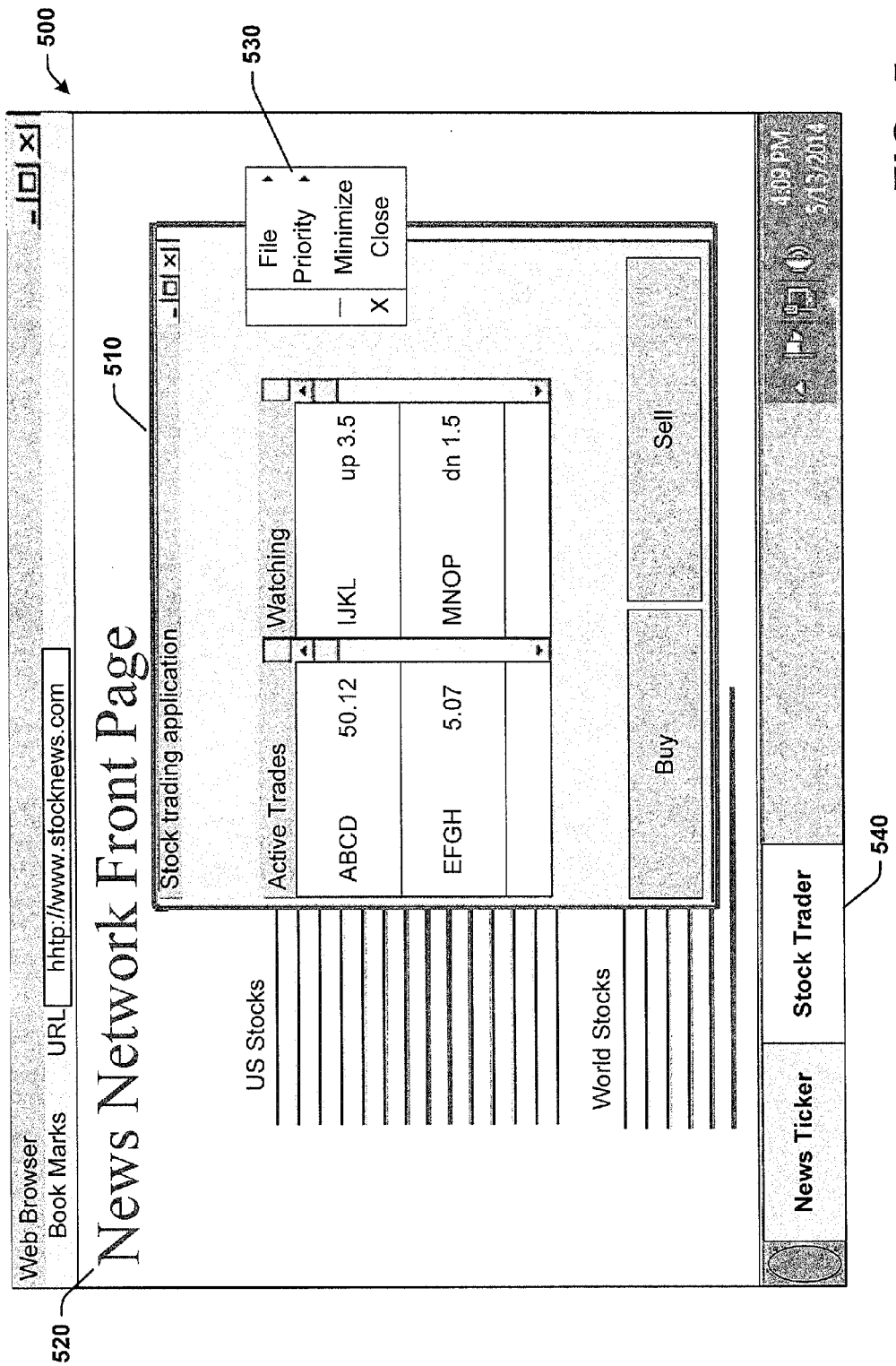
FIG. 5 depicts a diagram of an example system for generating a rendering of a priority configuration interface in accordance with to one or more disclosed aspect.

FIG. 5 illustrates an exemplary rendering 500 for implementing one or more aspects of the subject disclosure. Particularly, rendering 500 can be configured for providing an interface for a user to control priorities at an application level. For example, a user can provide input and a system (e.g., system 100, 200, 300, 400, etc.) can be configured for receiving the input to determining priorities of memory access requests associated with applications. Components configured for generating rendering 500 can reside at least partially within an electronic device, a memory, a memory module, a handheld computer, a personal computer, a networked computer, or the like, such as those of systems 100-400. It is to be appreciated that rendering 500 is but one exemplary rendering configured for receiving input at an application level.

As illustrated in FIG. 5, rendering 500 can include renderings of various application interfaces, such as web browser interface 520 and stock trading application interface 510. Rendering 500 can further include a priority-configuration interface 530 and other system interfaces, such as task bar 540. It is appreciated that rendering 500 can be rendered by various system and/or devices, such as desktop computers, laptop computers, smart phones, tablets, set top boxes, personal digital assistants (PDA's), or the like.

Rendering 500 can represent a display of a user device such as laptop computer. A user can interact with the device to provide input. In an example, the user can be a stock trader who utilizes stock trading application, via stock trading application interface 510, to perform stock trades and utilizes a web browsing application, via web browser interface 520, to receive information about various businesses. The user can determine that the stock trading application is more important to the user than the web browsing application. Accordingly, operations associated with the stock trading application should have a higher priority than operations associated with the web browsing application.

According to at least one embodiment of the present application, a user can assign priorities, such as through priority-configuration interface 530. For example, a user can perform a right-click or other operation to instruct a system to render priority-configuration interface 530. The priority-configuration interface 530 can be configured for assigning a priority level to the stock tracking application (e.g., a high or elevated priority). A memory access handling unit (e.g., memory access handling unit 120) can be configured for assigning an elevated priority for all operations associated with the stock tracking application. If a user does not indicate a level of priority, the memory access handling unit (e.g., memory access handling unit 120) can be configured for assigning a default priority level.

It is noted that priority levels can be saved for later use and/or can be applied at different times. In some embodiments, a system can provide a list of applications and priority levels. It is noted that various other interfaces can be utilized according to aspects of the subject disclosure.

The aforementioned diagrams have been described with respect to interaction between several components, or memory architectures. It should be appreciated that such diagrams can include those components and architectures specified therein, some of the specified components/architectures, and/or additional components/architectures. Sub-components could also be implemented as electrically connected to other sub-components rather than included within a parent architecture. Additionally, it should be noted that one or more disclosed processes could be combined into a single process providing aggregate functionality. For instance, a program process can comprise an erase process, or vice versa, to facilitate programming and erasing a memory by way of a single process. In addition, it should be appreciated that respective rows, sub-blocks, blocks, etc., can be written to, read, erased, or the like individually in as an aggregate. Components of the disclosed architectures can also interact with one or more other components not specifically described herein but known by those of skill in the art.

Figure 6:
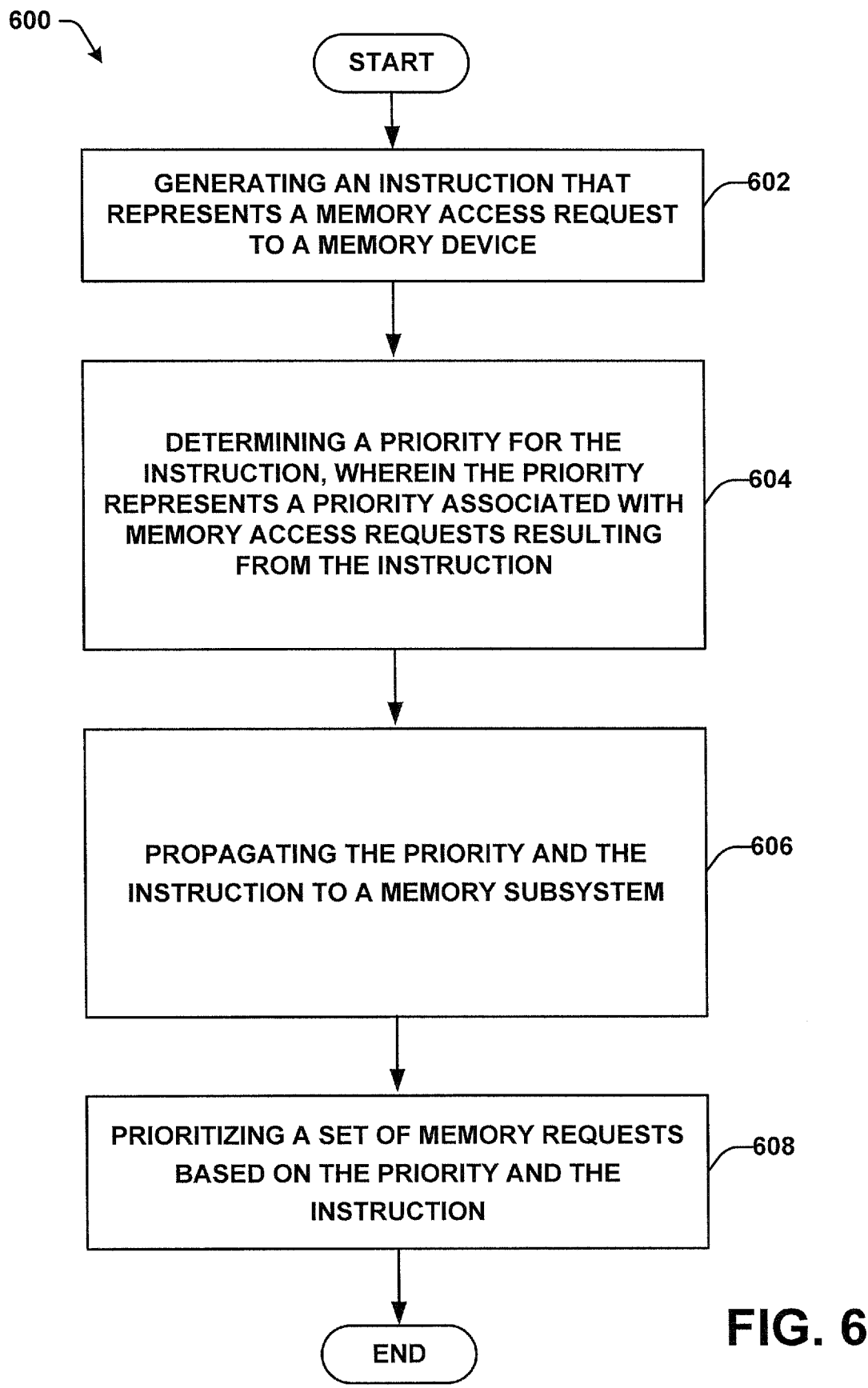
FIG. 6 illustrates a flowchart of an example method of propagating a memory access requests and priorities to a memory subsystem in accordance with to one or more disclosed aspect.
Figure 7:
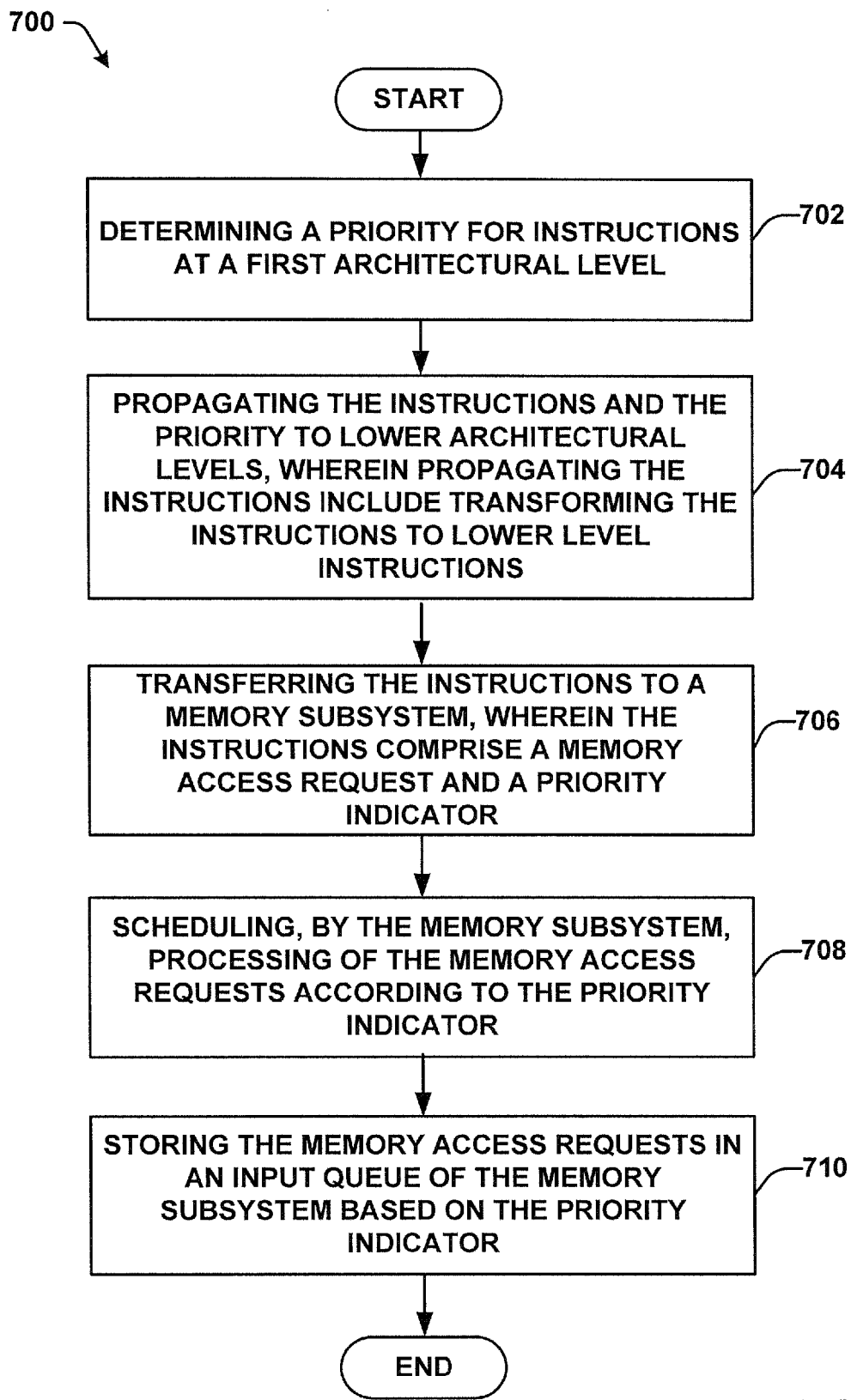
FIG. 7 illustrates a flowchart of an example method of determining priorities of memory access requests and propagating data to a memory subsystem in accordance with to one or more disclosed aspect.
Figure 8:
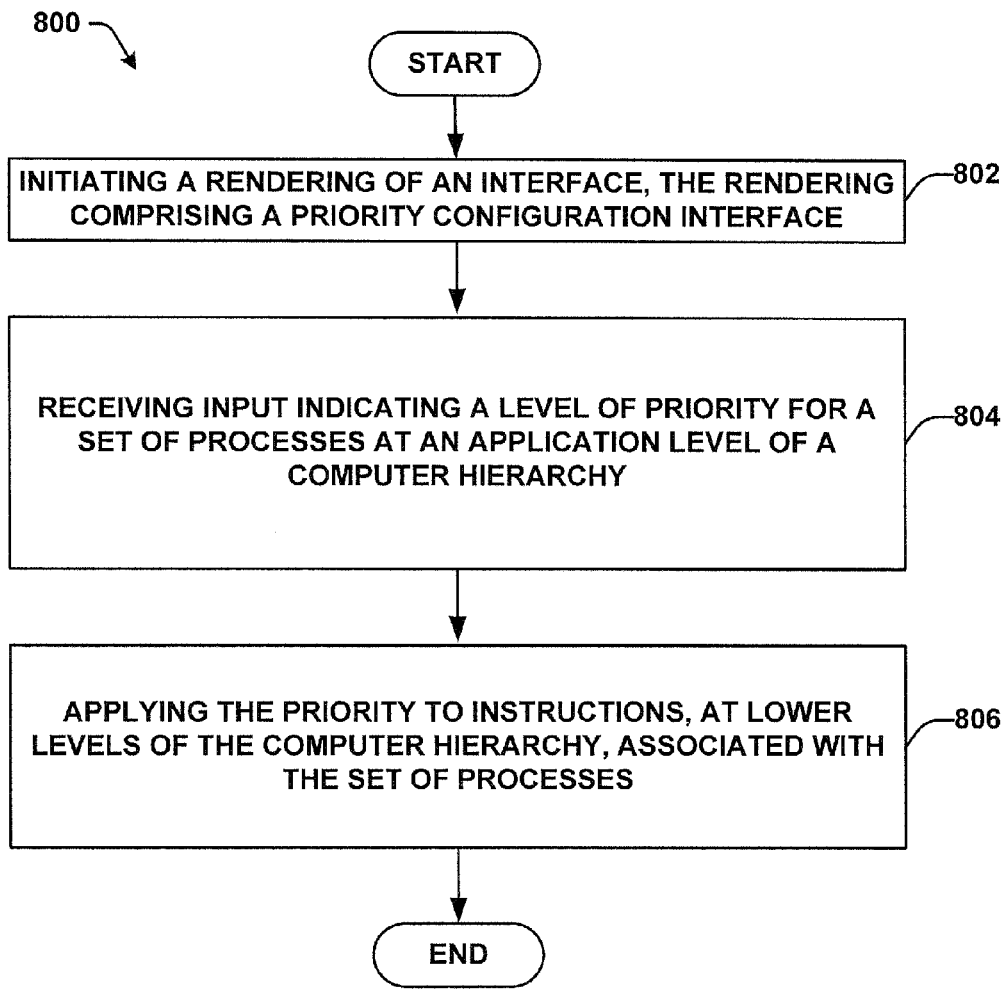
FIG. 8 illustrates a flowchart of an example method of initiating a rendering configured for determining priorities of processes in accordance with to one or more disclosed aspect.

In view of the exemplary diagrams described supra, process methods that can be implemented in accordance with the disclosed subject matter will be better appreciated with reference to the flow charts of FIGS. 6 through 8. While for purposes of simplicity of explanation, the methods of FIGS. 6 through 8 are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

FIG. 6 illustrates a flowchart of an example computer implemented method 600 for prioritizing memory access requests to a memory subsystem of a computing device. At reference numeral 602, a system comprising a processor can be configured for generating (e.g., via memory access handling unit 110) an instruction that represents a memory access request to a memory device.

At 604, the system can be configured for determining (e.g., via memory access handling unit 110) a priority for the instruction, wherein the priority represents a priority associated with memory access requests resulting from the instruction. As described herein, the priority can be represented as a scaled priority having virtually any level of priorities. At 606, the system can be configured for propagating (e.g., via memory access handling unit 110) the priority and the instruction to a memory subsystem. Propagating the priority and instruction can comprise generating lower level operations based on the instructions (e.g., transferring application instructions to assembly language, machine language, etc.). In an aspect, the method can include assigning and/or altering priorities at various levels of a computer hierarchy. For example, an OS level can alter priorities such that interrupts have increased priorities with respect to other instructions.

At 608, the system can be configured for prioritizing (e.g., via memory subsystem 120) a set of memory requests based on the priority and the instruction. In various aspects of the subject disclosure, the method can comprise scheduling the memory requests based on a comparison of priorities of other memory access requests such that memory access requests having higher priorities are serviced before memory access requests having lower priorities.

FIG. 7 illustrates a flowchart of an example computer implemented method 700 for propagating prioritized memory access requests to a memory subsystem of a computing device. At 702, a system comprising a processor can be configured for determining (e.g., via a first level memory access handling unit 210) a priority for instructions at a first architectural level. It is noted that the first architectural level can comprise any level of a computer hierarchy, such as an application level, compiler level, OS level, and the like. The method can be configured to include one or more priority algorithms that, when executed by a processor, facilitate determining priorities of instructions. Priority algorithms can be based on achieving a desired level of efficiency (e.g., energy consumption, etc.), throughput, and the like. In various embodiments, priority algorithms can be overridden to accommodate a user selected priority.

At 704, the system can be configured for propagating (e.g., via first level memory access handling unit 210, second level memory access handling unit 212, etc.) the instructions and the priority to lower architectural levels, wherein propagating the instructions include transforming the instructions to lower level instructions. In accordance with various embodiments of the subject disclosure, propagating instructions can include utilizing one or more memory access handling units configured for receiving instructions and communicating the instructions to appropriate components of a computing system. The instructions can be transformed or translated such that lower levels of a computer system can interact with various devices, such as memory devices. In an aspect, lower levels can apply the priorities to priority schemas or algorithms, such that a priority is propagated throughout an entire hierarchy. At 706, the system can be configured for transferring the instructions to a memory subsystem, wherein the instructions comprise a memory access request and a priority indicator.

At 708, the system can be configured for scheduling (e.g., via memory subsystem 420), by the memory subsystem, processing of the memory access requests according to the priority indicator. The priority indicator can take various forms such as a bit indicator, a dedicated pin, and the like. In response to determining priorities, at 710, the system can be configured for storing (e.g., memory subsystem 420) the memory access requests in an input queue (e.g., input queue 424) of the memory subsystem based on the priority indicator. The memory access request be placed or stored in the queue such that the memory access request will be serviced ahead of lower priority memory access requests.

Method 800 illustrates a flowchart of an example method 800 for initiating a rendering configured for receiving input associated with prioritizing applications of a computing system. The method 800 can be implemented by one or more systems described herein. At 802, the system can be configured for initiating (e.g., via processor 304) a rendering of an interface (e.g., rendering 500), the rendering comprising a priority configuration interface. For example, an output device (e.g., display) can render the interface and a user can view a priority configuration interface that is configured for enabling a user to provide input for managing priorities of applications and associated memory access requests.

At 804, the system can be configured for receiving (e.g., via memory access handling unit(s) 310) input indicating a level of priority for a set of processes at an application level of a computer hierarchy. The input can comprise an indicator of a level of priority, such as a level selected by a user. In one or more embodiments, the input can comprise a time frame and/or time that represents a desired period for applying a priority. For example, a user may wish that an email application has a higher priority during business hours and a media playing application has a higher priority after business hours (e.g., during a train ride from work). Accordingly, the user can provide input that indicates periods for applying higher or lower priorities to the applications. It is noted that the method can include training a computer system to identify patterns or automatically apply priorities based on inferences. At 806, the system can be configured for applying (e.g., via memory subsystem 320) the priority to instructions, at lower levels of the computer hierarchy, associated with the set of processes.

Example Computing Environment

Figure 9:
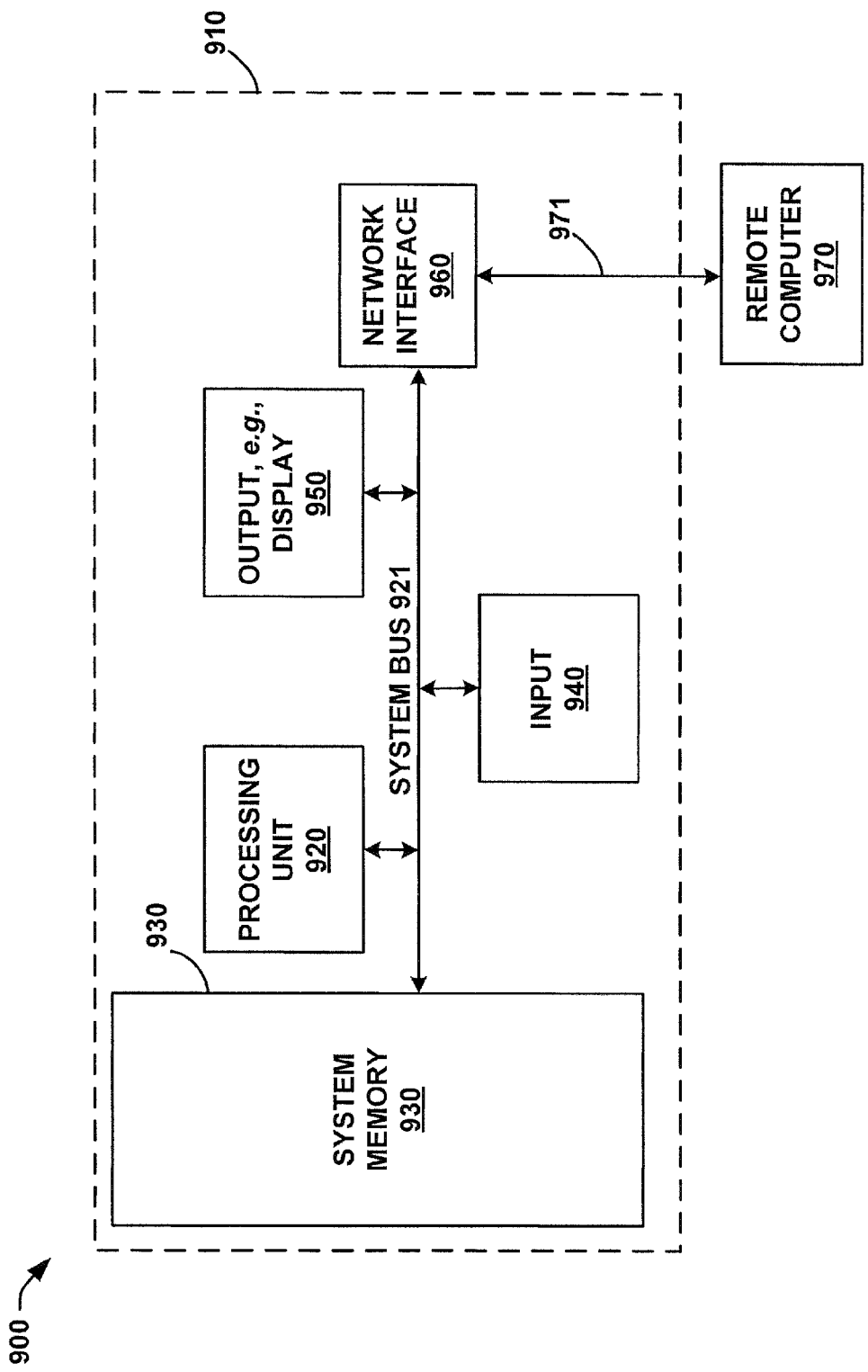
FIG. 9 illustrates a block diagram of an example electronic computing environment that can be implemented in conjunction with one or more aspects described herein.

As mentioned, advantageously, the techniques described herein can be applied to any device and/or network where it is desirable to employ one or more identification codewords for a rate-adapted version of a data stream. It is to be understood, therefore, that handheld, portable and other computing devices and computing objects of all kinds are contemplated for use in connection with the various non-limiting embodiments. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary computing system environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface 960 or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
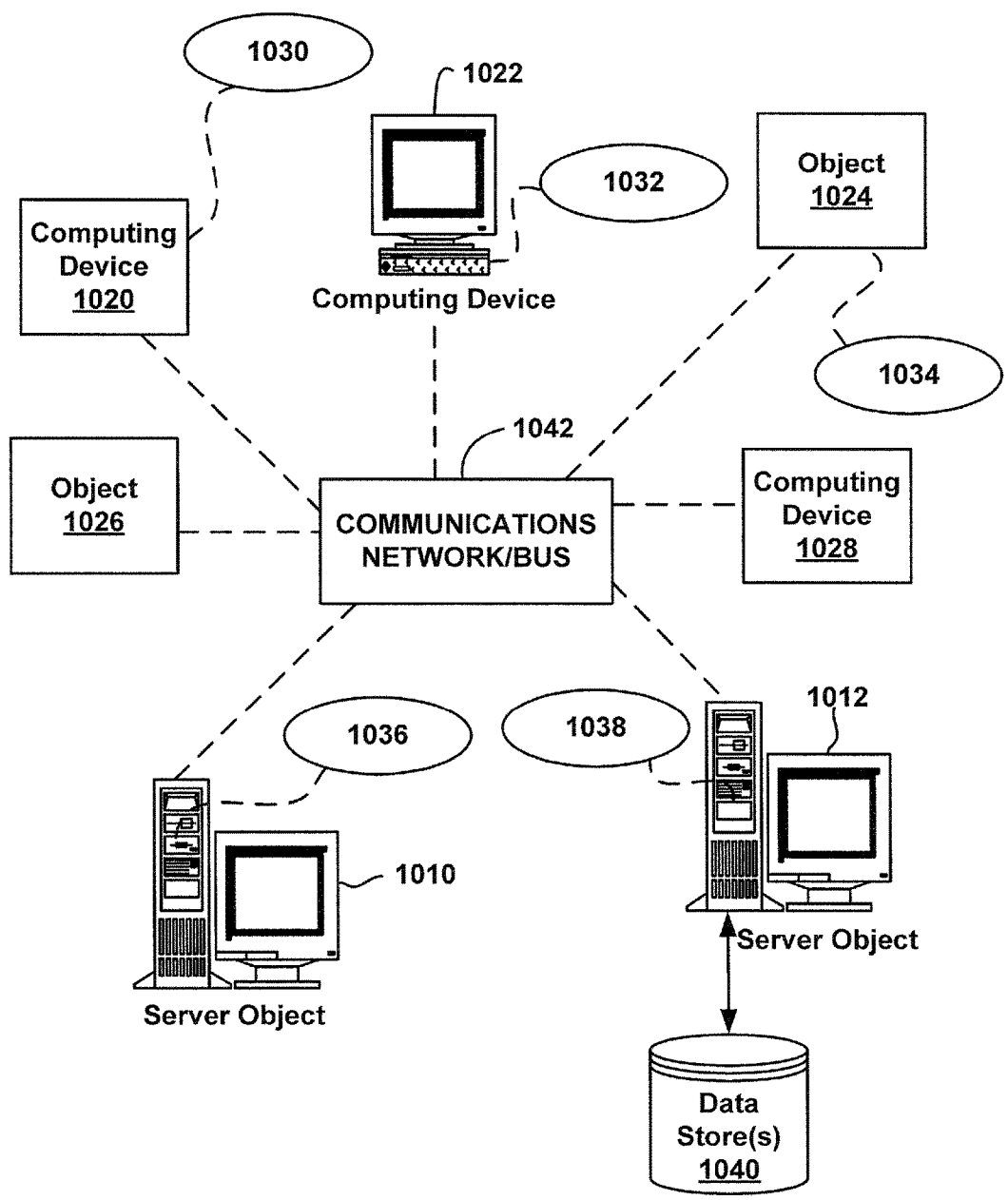
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1040 can include registers, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for managing priority to a memory subsystem, comprising:
a first level memory access handling unit configured to generate memory access requests in accordance with corresponding instructions originating from multiple levels of a computing system architecture, the multiple levels comprising at least an application level, a compiler level, an operating system level, and a microarchitectural level, wherein the first level memory access handling unit is of a higher level of the computing system architecture relative to the memory subsystem, and the instructions generated by the multiple levels, have associated priority indicators assigned in accordance with prioritization schemes respectively associated with the multiple levels, the priority indicators comprising first priority indicators assigned to a first subset of the instructions originating at the application level based on user-defined application priorities, second priority indicators assigned to a second subset of the instructions originating at the compiler level based on a determination of whether the second subset of the instructions are associated with shared data or private data, and third priority indicators assigned to a third subset of the instructions originating at the operating system level based on a determination of whether the third subset of the instructions are associated with an interrupt at the operating system level; and
a memory controller unit of the memory subsystem configured to receive the memory access requests and the priority indicators, and to assign respective memory access priorities of the memory access requests based on the priority indicators.

2. The system of claim 1, wherein the memory controller unit is further configured to prioritize the memory access requests in an input queue of the memory controller unit based on the respective memory access priorities.

3. The system of claim 1, wherein the priority indicators accord to a bit level priority protocol.

4. The system of claim 1, further comprising a plurality of other memory access handling units at respective different levels of the computing system architecture and configured to generate other memory access requests and respective priority indicators.

5. The system of claim 1, wherein the memory controller unit of the memory subsystem is further configured to alter one or more of the memory access priorities of one or more of the memory access requests based on a fairness scheduling process.

6. The system of claim 1, wherein the first level memory access handling unit is further configured to determine one of the first priority indicators of one of the first subset of the instructions based on the user-defined application priorities of respective applications executing on the application level that generated the one of the first subset of the instructions.

7. The system of claim 1, wherein the first level memory access handling unit is further configured to determine one of the first priority indicators of one of the first subset of the instructions further based on a type of application that generated the one of the first subset of the instructions.

8. The system of claim 1, wherein the first level memory access handling unit is further configured to render, on a display associated with the system in response to a right-click operation performed on a graphic of an application executing on the application level, an interface display configured to receive, via manual input, application priority information that defines one of the user-defined application priorities for the application, and at least one of the first priority indicators is assigned to one of the first subset of the instructions generated by the application based on the application priority information.

9. A computer-implemented method for managing priority to a memory subsystem, comprising:
  assigning, by a system comprising a processor, priority indicators to respective instructions originating from respective multiple levels of a computing system architecture, wherein the multiple levels comprise at least an application level, a compiler level, an operating system level, and a micro-architectural level, and the assigning comprises
    assigning first priority indicators to a first subset of the instructions originating at the application level based on relative priorities of applications,
    assigning second priority indicators to a second subset of the instructions originating at the compiler level based on a determination of whether the second subset of the instructions are associated with shared data or private data, and
    assigning third priority indicators to a third subset of the instructions originating at the operating system level based on a determination of whether the third subset of the instructions are associated with an interrupt at the operating system level;
  generating, by the system, memory access requests to a memory device, the memory access requests respectively corresponding to the instructions;
  determining, by the system, respective priorities for processing the memory access requests based on the priority indicators;
  propagating, by the system, the priorities and the memory access requests to the memory subsystem of the computing system architecture; and
  prioritizing, by the system, processing of the memory requests based on the priorities.

10. The computer-implemented method of claim 9, wherein the propagating the priorities and the memory access requests comprises translating one of the instructions originating at a level higher than the memory subsystem to a memory access request.

11. The computer-implemented method of claim 9, wherein the prioritizing the processing of the memory requests comprises altering an input queue of the memory subsystem based on the priorities to cause a memory request having a first priority to be serviced before other memory requests stored in the input queue that have respective second priorities that are lower than the first priority.

12. The computer-implemented method of claim 9, wherein the propagating the priorities comprises generating at least one memory access request associated with at least one of the instructions, and wherein one or more bits of the at least one memory access request indicate a priority of the at least one memory access request.

13. The method of claim 9, further comprising:
  in response to a right-click operation performed on an application graphic of one of the applications executing on the application level of the computing system architecture, rendering, by the system, an interface display configured to receive application priority information for the one of the applications; and
  receiving, by the system via interaction with the interface display, the application priority information for the one of the applications, the application priority information defining one of the relative priorities for the one of the applications.

14. The computer-implemented method of claim 9, further comprising altering, by the system, one or more of the priorities for processing one or more of the memory access requests based on a fairness scheduling process.

15. A non-transitory computer-readable medium having stored thereon executable instructions that, in response to execution by a processor, causes a system to perform operations, the operations comprising:
  receiving instructions that require a read request from a memory device, the instructions originating from multiple levels of a computing architecture, the multiple levels comprising at least an application level, a compiler level, an operating system level, and a micro-architectural level, wherein the instructions have associated priority indicators assigned in accordance with prioritization schemes respectively associated with the multiple levels, and the priority indicators comprise first priority indicators assigned to a first subset of the instructions originating at the application level based on relative priorities of applications that generate the first subset of the instructions, second priority indicators assigned to a second subset of the instructions originating at the compiler level based on a determination of whether the second subset of the instructions are associated with shared data or private data, and third priority indicators assigned to a third subset of the instructions originating at the operating system level based on a determination of whether the third subset of the instructions are associated with an interrupt at the operating system level;
  determining respective priorities of memory access requests associated with the instructions based on the priority indicators;
  propagating priority information identifying the respective priorities and the memory access requests from higher levels of the computing architecture to lower levels of the computing architecture; and
  propagating the priority information and the memory access requests to a memory controller.

16. The non-transitory computer-readable medium of claim 15, wherein the operations further comprise:
  altering a schedule for processing the memory access requests based on the priority information.

17. The non-transitory computer-readable medium of claim 15, wherein the determining the respective priorities comprises:
  receiving input representing a level of priority for a computer process that generates one or more of the instructions.

18. The non-transitory computer-readable medium of claim 15, wherein the propagating the priority information comprises:

generating at least one of the priority indicators based on a type of application that generated a corresponding at least one of the instructions.

19. The non-transitory computer-readable medium of claim 15, wherein
the operations further comprise rendering an interface display in response to a right-click operation performed on a graphic associated with an application, of the applications, executing on the application level of the computing architecture, the interface display configured to receive application priority information for the application that defines a relative priority for the application, and
one of the first priority indicators is assigned to one of the first subset of the instructions originating from the application based on the application priority information.

20. The non-transitory computer-readable medium of claim 15, wherein the operations further comprise altering one or more of the priorities of one or more of the memory access requests based on a fairness scheduling process.

* * * * *